United States Patent Office 3,223,538
Patented Dec. 14, 1965

3,223,538
FOAMED ZIRCONIA INSULATING MATERIAL
Robert E. Wiegert, Middletown, and Thomas J. Byrne, Franklin, Ohio, assignors to The Aeronca Manufacturing Corporation, Middletown, Ohio, a corporation of Ohio
No Drawing. Filed Feb. 7, 1962, Ser. No. 171,581
9 Claims. (Cl. 106—40)

This invention relates to foamed or cellular insulating materials principally constituted by a composite of zirconia and zirconium phosphate.

A principal objective of this invention has been to provide a foamed insulating material especially adapted for use as a heat shield at temperatures in the 3400 to 4300° F. range, and which is characterized by relatively low density, low thermal conductivity and excellent thermal shock resistance.

The development of re-entry vehicles, that is, vehicles which can re-enter the earth's atmosphere from space at very high speeds and land safely, has presented a need for heat shielding materials to protect the vehicle, or certain critical portions of it, from the extremely high temperatures generated by the severe aerodynamic heating which accompanies re-entry. Temperatures as high as 4200° F. may be encountered. In addition to this, the criticality of the weight factor in space vehicle design calls for insulating materials of low density and low thermal conductivity. Moreover, the rate of the frictional heating which occurs during re-entry is so rapid that only materials of excellent thermal shock resistance are of utility for this purpose.

Zirconia insulating materials have heretofore been produced, but past materials of this type have been very heavy per unit volume and have displayed relatively high thermal conductivities. For those reasons such past materials are entirely unsuitable as heat shields for re-entry vehicles. In contrast to previous zirconia-containing insulating materials, compositions produced in accordance with the present invention are characterized by densities in the range of about 65 to 100 pounds per cubic foot and thermal conductivities in the range of about 2.0 to 30 B.t.u. per hour per square foot per ° F. per inch of thickness at temperatures in the 2500–2900° F. range.

We have empirically discovered and determined that a mixture of zirconia ($ZrO_2$), so-called "rare earth oxides" (which are principally constituted by ceria, $CeO_2$), phosphoric acid ($H_3PO_4$), powdered aluminum metal and water will react to produce a foamed or cellular mass which has excellent insulating and other mechanical characteristics but which is much lighter than previously known zirconia materials. We have further found that the relative proportions between these components are rather critical to obtain the desired low density-low conductivity-high thermal shock resistance characteristics in the final product.

Simply put, in the practice of this invention, zirconia, rare earth oxides and finely powdered aluminum metal are mixed as a dry powder in proportions to be specified. This mixture is reacted under controlled conditions with phosphoric acid and water and is cast in a mold which may comprise a honeycomb panel to produce a light cellular body which is then hardened or cured at an elevated temperature but far below conventional ceramic firing temperatures.

Several different types of reactions take place when the phosphoric acid is added to the powdered mixture. In overall terms, the phosphoric acid reacts with the zirconia to form zirconium phosphate and water:

$$3ZrO_2 + 4H_3PO_4 \rightarrow Zr_3(PO_4)_4 + 6H_2O$$

The heat of the reaction, which is exothermic, vaporizes the water, and the steam which is so formed is partly responsible for the foaming that thereupon takes place. Although the reactions involving the rare earth oxides are complex, they are typified by the reaction between the phosphoric acid and ceria:

$$4H_3PO_4 + 3CeO_2 \rightarrow Ce_3(PO_4)_4 + 6H_2O$$

The metallic aluminum reacts with the acid to produce aluminum phosphate and hydrogen:

$$2H_3PO_4 + 2Al \rightarrow 2AlPO_4 + 3H_2$$

The gaseous hydrogen which is released contributes to the foaming action with the steam. The evolved gases are released as bubbles throughout the reaction mass and impart a light, cellular structure to it. In a period of a few minutes the heat released by the reaction drives off excess water and gels or sets the product so that the cellular structure is preserved. The reacted mass is an integral, more or less homogeneous composite of excess or unreacted zirconia and rare earth oxides and reaction product phosphates and is permeated by a large number of small pores or cells. The final curing step hardens the reacted mass and improves its physical strength.

As previously stated, the proportions of the components of the reaction mixture are rather critical for obtaining the desired properties. Zirconia in powdered form, preferably partly of about 325 mesh size and partly of about 100 mesh size, is utilized in the amount of about 50–65 parts by weight. The rare earth oxides, which are available commercially as a 90% pure concentrate, also in powdered form preferably of about 325 mesh size, are present in the amount of about 20–25 parts. Metallic aluminum in finely divided form is added in the amount of about 0.05–1.0 part. Other hydrogen displacing metals such as zinc may be substituted for aluminum.

The zirconia is preferably incorporated in different grain sizes because we have found that the strength of the product is thereby improved and that drying shrinkage is reduced. More importantly, the use of zirconia powders of at least two different mesh sizes improves the thermal shock resistance of the product in comparison to the use of zirconia of a single mesh size.

The rare earth oxides, which are a commercially available mixture of several oxides of rare earth metals, have been found to greatly improve the thermal shock resistance of the foamed product. In addition, the rare earth oxides also improve the emissivity of the product, thereby further improving the present material's effectiveness for heat shielding use. It is also pointed out that the several materials are not present in stoichiometric quantities, and that not all of the zirconia and other materials react with the phosphoric acid.

The dry mixture is wetted with about 8–14 parts of water, and the reaction is initiated by the addition of phosphoric acid. The phosphoric acid is preferably in 85% aqueous solution and is added in the amount of about 10–20 parts, but other equivalent concentrations may be used.

The phosphoric acid performs two functions: it reacts to release gases which impart a cellular structure to the material, and the solid reaction products which it produces chemically bond the mass to form a coherent hard mass.

When the phosphoric acid is added to the mixture of dry powders, foaming begins almost immediately. If the mixture is not disturbed or agitated while forming occurs, the product will be very highly foamed. Agitation of the reaction mixture, i.e., stirring, mixing or other handling during hardening or casting, tends to destroy the cells and has the general effect of increasing the density and conductivity of the product. The foaming reaction is usually largely completed within a few minutes. The material is cast or applied to a desired form while it is still flowable, and is permitted to harden in the form.

The foamed structure requires curing at controlled conditions to impart better strength and rigidity to it. Peculiarly, however, we have found that very high drying temperatures, e.g., above about 600 or 800° F., are not only not necessary but are in fact undesirable. Thus, one of the important advantages of the present invention is that curing is effected relatively quickly without the use of very high temperatures or long initial drying times at room temperature. In general, lower curing temperatures and/or shorter curing times tend to impart lower densities to the product than do higher curing temperatures and longer curing times. We have established that excellent characteristics are imparted to the product by curing the set, initially reacted mass in a furnace at 200° F. for about two hours and then at 400° F. for about two hours. It is contemplated, however, that other cure cycles can be used, including shorter or longer times and somewhat different temperatures.

Following are specific examples of various compositions and cure cycles in accordance with the discovery we have made:

EXAMPLE 1

| Composition | Parts by Weight | Cure Cycle |
| --- | --- | --- |
| 100 mesh $ZrO_2$ | 34.0 | 200° F.—2 hrs. |
| 325 mesh $ZrO_2$ | 20.4 | 400° F.—2 hrs. |
| 90% rare earth oxide | 20.4 | |
| $H_3PO_4$ | 10.2 | |
| $H_2O$ | 13.6 | |
| Al powder | 0.05 | |

EXAMPLE 2

| Composition | Parts by Weight | Cure Cycle |
| --- | --- | --- |
| 100 mesh $ZrO_2$ | 30.8 | Placed in furnace at 200° F., temperature gradually raised to 600° F. over 20 hour period; temperature held at 600° F. for 24 hours. |
| 325 mesh $ZrO_2$ | 18.8 | |
| 90% rare earth oxide | 21.6 | |
| $H_3PO_4$ | 17.9 | |
| $H_2O$ | 9.6 | |
| Al powder | 0.1 | |

EXAMPLE 3

| Composition | Parts by Weight | Cure Cycle |
| --- | --- | --- |
| 100 mesh $ZrO_2$ | 34.8 | |
| 325 mesh $ZrO_2$ | 20.8 | |
| 90% rare earth oxide | 20.8 | 200° F.—20 hrs. |
| $H_3PO_4$ | 10.4 | 400° F.—20 hrs. |
| $H_2O$ | 11.8 | |
| Al powder | 0.05 | |

It should be noted that the curing times given were used in the production of blocks up to 1″ x 6″ x 6″ in size. The production of insulating materials in larger sizes may and probably will require some variation in cure cycle for best results.

The density of the product can most easily and accurately be controlled within the approximate 65–100 pounds per cubic foot range by varying the length of the initial curing phase and by varying the quantity of powdered aluminum which is incorporated in the initial mixture. The precise density of the product depends upon many process variables not all of which can be specified accurately, including the manner in which the phosphoric acid is mixed with the dry powdered materials, atmospheric conditions, and the shape of the form in which the material is cast. In general, however, shorter cure times, particularly in the initial part of the curing process, minimize density. Higher contents of metallic aluminum, within the specified range, effect greater evolution of gas and thereby increase foaming.

As previously mentioned, the foaming reaction begins almost immediately upon the addition of phosphoric acid to the wetted powder. Once the reaction has been initiated, handling or mixing of the reaction mass before it has set tends to destroy the gaseous bubbles which form, and the reacting mixture should therefore be cast or allowed to harden with a minimum of handling. The material may be poured into the form in which it is to harden while foaming is taking place, and should be enclosed or kept under restraint until the 200° F. phase of the cure cycle is completed. Curing should then be continued, in accordance with the general procedure described.

As previously suggested, one particular purpose for which the foamed insulating material of this invention is especially suited is for application to honeycomb composite metal structures of the type which are used in the fabrication of high strength-to-weight aerodynamic components. For this purpose, the reaction mass is poured into or is otherwise applied to the honeycomb structure, preferably into the individual cells thereof while the reaction is taking place. The panel may be vibrated when the reaction is nearly complete to work the mass into the cells, since at this time the liquid will be very viscous. Restraints are applied until the composition sets. The resultant structure is extremely strong and is highly heat resistant. It will be appreciated however, that the composition of this invention is not limited to such use alone, and that this illustration is given only by way of example.

Where, as in the example just given, the insulation is to be applied to a metal form which might be attacked by residual oxidizing gases during curing or in use, it is desirable to include in the reaction mass a small quantity of an absorbent material, such as activated carbon in the proportion of about 1–1.5 parts by weight. This material takes no part in the foaming reaction but is incorporated to absorb gases which might otherwise attack a honeycomb or other structure during the curing and application phases.

What is claimed is:

1. A method of producing a foamed zirconia insulating material comprising the steps of preparing a mixture consisting essentially of about 50–65 parts by weight of granular zirconia, about 20–25 parts granular cerium dioxide, 0.05–1.0 part powdered aluminum metal, about 8–14 parts water, and about 10–20 parts phosphoric acid in 85% aqueous solution, said zirconia, cerium dioxide and aluminum metal first being mixed, said water and phosphoric acid then being added to produce a foaming reaction in which steam and hydrogen are evolved which impart a light cellular structure to the reaction mass, the heat of reaction thereby released rapidly gelling the mass so that the cellular structure is preserved, and subjecting the resultant product to temperatures in the range of 200–800° F. for a period of hours sufficient to further harden the product.

2. The method of claim 1 wherein said zirconia is of at least two different mesh sizes.

3. The method of claim 1 wherein a major part of said zirconia is 100 mesh size and wherein a minor part of said zirconia is 325 mesh size.

4. The method of claim 1 wherein said product is subjected to temperatures in the range of about 200–600° F. for a period of about 4–44 hours.

5. A method of producing a foamed zirconia insulating material comprising the steps of preparing a mixture consisting essentially of about 50–65 parts by weight of granular zirconia, about 20–25 parts granular cerium dioxide, 0.05–1.0 part powdered aluminum metal, up to about 1.5 parts activated carbon, about 8–14 parts water, and about 10–20 parts phosphoric acid in 85% aqueous solution, said zirconia, cerium dioxide, carbon and aluminum metal first being mixed, said water and phosphoric acid then being added to produce a foaming reaction in which steam and hydrogen are evolved which impart a light cellular structure to the reaction mass, the heat of reaction thereby released rapidly gelling the mass so that the cellular structure is preserved, and subjecting the resultant product to temperatures in the range of 200–

800° F. for a period of hours sufficient to further harden the product.

6. The method of producing a lightweight foamed zirconia material which comprises the steps of preparing a mixture consisting essentially of about 50–65 parts by weight of granular zirconia, about 20–25 parts granular cerium dioxide, 0.05–1.0 part powdered aluminum metal, about 10–20 parts phosphoric acid and about 8–14 parts water, said zirconia, cerium dioxide and aluminum metal first being mixed together and said phosphoric acid and water thereafter being added to the mixture to produce a foaming reaction between said acid, zirconia, cerium dioxide and aluminum metal in which steam and hydrogen are evolved as bubbles in the reaction mass and impart a cellular structure to it, casting the reaction mass in a form and holding it under restraint therein until said mass has gelled, and curing the gelled mass at a temperature in the range of about 200–800° F., to produce a product having a density within the range of approximately 65–100 pounds per cubic foot.

7. The method of claim 6 wherein said mass is cured at temperatures between 200 and 600° F.

8. The method of claim 6 wherein said mass is cured at about 200° F. for about two hours and then at about 400° F. for at least about two hours.

9. The method which comprises the steps of preparing a mixture consisting essentially of about 50–65 parts by weight of zirconia of different mesh sizes, about 20–25 parts 90% pure cerium dioxide, about 0.05–1.0 part of a hydrogen displacing metal, about 10–20 parts phosphoric acid in 85% aqueous solution and about 8–14 parts water, said water and phosphoric acid being added to the dry mixed zirconia, dioxide and metal, whereby a foaming reaction is produced in which gases are evolved to impart a cellular structure to the reaction mass, permitting the mass to set, and hardening the resultant product at a temperature above about 200° F. and not higher than about 800° F.

References Cited by the Examiner

UNITED STATES PATENTS

| 1,470,195 | 10/1923 | De Roibul | 106—57 |
| 2,341,561 | 2/1944 | Kinzie | 106—41 |
| 2,533,899 | 12/1950 | Ryner | 25—156 |
| 2,852,401 | 9/1958 | Hansen | 106—65 |
| 2,966,421 | 12/1960 | Zimmerman et al. | 106—65 |
| 2,992,930 | 7/1961 | Wheeler et al. | 106—65 |
| 3,002,248 | 10/1961 | Willson | 25—45 |
| 3,050,812 | 8/1962 | Felder | 25—156 |

TOBIAS E. LEVOW, *Primary Examiner.*